United States Patent Office 3,424,616
Patented Jan. 28, 1969

3,424,616
METHOD OF REMOVING COATINGS CAUSED BY STORAGE OF MEAL OR FLOUR IN DRY BULK FORM AND PARTICULARLY FOR PREPARING FOR RE-USE LINED RAILROAD HOPPER CARS
Robert W. Townsend, 3908 Rugby Drive, Toledo, Ohio 43614
No Drawing. Filed May 3, 1966, Ser. No. 547,148
U.S. Cl. 134—7     10 Claims
Int. Cl. B08b 9/08

In its currently most important aspect, this invention relates to a method of preparing railroad covered hopper cars, particularly plastic-lined covered hopper cars, and truck trailers and the like for substantially immediate re-use in transporting meal and flour in dry bulk form. More generally, the invention relates to a method of removing coatings caused by condensation on the interior surfaces of compartments used for the transportation or storage of meal or flour and the like in dry bulk form.

The term "meal" refers to the usually coarsely ground and unbolted seeds of a cereal grass or pulse, to any ground dried food material, as meat or fish, and to products resembling seedmeal especially in particle size or texture and formed by grinding or rapid crystallization. The term "flour" refers to a finely ground meal of wheat usually largely freed from bran, to a similar finely ground meal of other cereal grains and edible seeds, as rye, barley, buckwheat, rice, corn, bean, and soybean, and to the product derived from grinding fine any dried food material such as potatoes, bananas, peanuts, etc.

For a number of years meal and flour products have been transported in bulk form in railroad covered hopper cars or in trailer bodies adapted for trucking over the highways, and have been stored temporarily in closed storage bins or compartments and the like. One type of covered hopper car which has found favor in the industry in transporting such materials is a plastic-lined or coated hopper car which includes a transverse canvas chute across the bottom of the hopper, through which chute the meal or flour is discharged under air pressure introduced into the upper part of the hopper car. Another known type of hopper car, preferably also plastic-lined or coated, includes apparatus to fluidize the bottom part of the flour or meal during unloading by passing air under pressure through the bottom of the hopper car into the meal or flour adjacent the bottom of the car. One such fluidizing arrangement includes a plenum chamber in or adjacent the bottom of the hopper car, the plenum chamber being covered with a textile fabric such as canvas or the like to support the flour or meal above the plenum chamber. The air passes from the plenum chamber through the textile fabric or canvas and fluidizes the meal or flour adjacent the bottom of the hopper car so as to expedite the unloading of the meal or flour through the one or more hopper openings formed in the bottom of the car.

During the transportation of meal or flour in such cars, as well as during transportation in aluminum trailer bodies, moisture in the air and inherent moisture in the flour tends to condense along the interior surfaces thereof, and this condensation creates a coating or deposits of meals or flour which adheres to the interior surfaces. These coatings or deposits, of course, remain on the interior surfaces after the flour or meal is removed from the car or trailer. Humidity also causes the formation of mold on the interior surfaces. This occurs also during the storage of meal or flour in storage bins or compartments. These coatings, deposits and/or mold must be removed from time to time so as to comply with sanitary standards for transporting or storing food products, the frequency of removal depending upon the particular circumstances. Thus the coatings, deposits and/or mold must be removed from the car or trailer before it can be returned to service for transporting the same or a similar product to other points. It is, of course, important that this be done in the most expeditious and efficient manner in order to restore the car or trailer to service as soon as possible, the same holding true for storage bins or compartments, although the urgency may not be as great as in the case of cars or trailers.

The removal of these coatings, deposits and/or mold, and the cleaning of the cars or trailers in particular, has been a problem in the industry for many years, and in general has been accomplished in two ways. First, the coatings, deposits, etc., have been removed by the shippers or owners by dry scrubbing and scraping. This has been effective up to a point, but for very "dirty" cars or trailers it has not been completely effective, and furthermore the plastic lining or coating which is commonplace in many hopper cars is rather susceptible to damage by this scrubbing and scraping. Second, especially in the case of railroad hopper cars, when the cars become "dirty" to the extent that they cannot be cleaned efficiently by scrubbing and scraping, they are and have been cleaned by high pressure water sprays of the order of 800 p.s.i. However, in general this high pressure water method is available only at federally or state approved regional cleaning points, many of which are operated by commercial car cleaners, and thus cleaning of the car at its point of loading is often precluded. After cleaning by the high pressure water method the cars are dried or permitted to dry, and are returned to the shipper for loading with a further product. This drying, of course, requires time, particularly for those cars which incorporate a textile fabric or canvas in the bottom of the car. The cars during this drying period are of no use to anyone, and they represent a substantial idle investment. Where the cars must be hauled to a regional cleaning point, further idle time is, of course, involved.

There thus is and has been in the milling, railroad, and trucking industries a definite and long-standing need for a method particularly of restoring the cars or trailers for food service use, and generally of removing the coatings, deposits, and/or mold from meal and flour transportation or storage compartments, which is economical, efficient, and fast, and which will permit substantially immediate re-use of the car or trailer or compartment, which can be accomplished at practically any point without specially designed equipment and without prior official approval, which utilizes non-toxic material, which does not harm the plastic lining or coating commonly found in hopper cars, and which does not require skilled labor. Also, especially for the milling industry, it is desirable that the method result in a usable byproduct or end product. It is a general object of this invention to provide such a method. More particularly it is an object of this invention to provide a method of removing coatings caused by condensation on the interior surfaces of an enclosed compartment which has been used for the transportation or storage of meal or flour in bulk form, comprising directing onto the coated surfaces a high pressure stream of air and granulated vegetable material, preferably an economical cellulose material. The preferred granulated cellulose material is corncob grits, although other less satisfactory materials may be used, possible substitutes being rice hulls, soybean hulls, and tapioca. Corncob grits are, however, believed to be decidedly superior in all respects.

The spent material and the removed coating preferably are removed by vacuuming following the blasting operation.

In accordance with the currently most important aspect of the invention, it is an object to provide a method of preparing an unloaded plastic-lined railroad covered hopper car for re-use in transporting meal or flour in dry bulk form, comprising removing residual meal or flour deposits from the interior surfaces of the car by directing onto the surfaces a stream of air and granulated nontoxic material, preferably a cellulose material, and vacuuming the removed deposits and the spent granulated material to remove them from the interior of the car. As previously stated, the much preferred granulated material comprises corncob grits.

Other and further objects, advantages, and features of the invention will be apparent from the following general description and the specific examples set forth herein.

My preferred material, corncob grits, is readily available commercially from a number of sources. In the manufacture of corncob grits, ear corn is received from farmers and is shelled, leaving only clean corncobs to be processed into the finished product. After shelling, the clean cobs are crushed into pieces smaller than one inch in size and are run through an open gas flame in a dryer at temperatures above fourteen-hundred degrees, and are then run through a hammer mill to reduce the size to $3/8$ inch and smaller. They are then run through a gradual reduction process into the final product. Throughout the entire process the lighter components and any foreign or trap metal and stone and other material are removed, thus ending up with only the hard woody portion of the corncobs. Corncob grits are nontoxic, being in current use as an extender of vitamins and materials in animal feed stuffs. They are rather highly absorbent, mildly abrasive, and non-clinging. They are commercially available in standard grades ranging from granules approximately $1/8$ inch in size to a fine powder-like form. The grade numbers usually represent the mesh size of the screens used in grading. For instance, grade $8/14$ is grit which passed through an eight mesh screen and over a fourteen mesh screen. While any of numerous grades can be used in my method, the presently preferred grades are $14/20$ and $14/40$, these being among the medium grades as classified in the present commercial market. The particular characteristics of corncob grits which facilitate the practice of my invention are their economy, their mild abrasiveness, their non-clinging nature, and to some extent their absorbency.

In accordance with my invention, the coating, deposits, and/or mold are removed from the interior surfaces of the car, trailer, or other compartments by blasting the surfaces with a stream of air and preferably corncob grits to remove the coatings, etc., and to complete the cleaning of the car, the grits and removed coatings are vacuumed from the car. The vacuuming is very effective apparently primarily because of the non-clinging nature of the corncob grits. The blasting is accomplished quickly and easily by using commercially available standard blasting equipment, and the vacuuming can be accomplished by any suitable vacuuming apparatus. The blasting does not seem to damage the interior surfaces involved, even in the case of plastic lining, and it is very effective in removing the coatings and deposits as well as any mold which may be formed on the interior surfaces.

As an example of the practice of my invention, flour deposits have been cleaned from the hatch covers, top, ends, and the upper three to four feet of the vertical sides of a plastic-lined covered hopper car by blasting with size $14/20$ corncob grits using an air pressure of 80 p.s.i. at the air receiver. A total of only four 50-pound bags of grits were required, and the blasting time was approximately $1\frac{1}{2}$ hours. A one-quarter inch inner diameter blast nozzle was used, and it required approximately 70 c.f.m. at 80 p.s.i. guage pressure. The blasting was done by use of a blasting machine with a fifty foot hose and one-quarter inch venturi nozzle. The blast nozzle was held two to three feet from the surfaces to be cleaned, and the blasting did not cut or damage the plastic lining of the covered hopper cars. The blasting was done by one operator inside the covered hopper car. The operator may stand or sit on an extendable plank which may be supported by a hopper frame and/or ladder. Vacuuming to remove all particles of cob grits and flour scale was done by use of a Stationary Vacuum Cleaner. The vacuum hose used to remove cob grits and flour scale from the plastic-lined hopper car was $1\frac{1}{2}$ inches inside diameter.

A second hopper car was cleaned of a cornmeal deposit so that it could be used in bulk flour service immediately thereafter. This cleaning was accomplished in approximately forty-five minutes, and required only two 50-pound bags of corncob grits. The same equipment was used as in the preceding example, but the second bag of grits was size $14/40$. This finer grit cleaned somewhat faster and more efficiently than the size $14/20$ grits. Again there was no damage to the plastic lining of the covered hopper car.

After the vacuuming operation, the cars were loaded with bulk flour. The vacuuming process requires only about thirty minutes.

The vacuumed flour or meal deposits and the corncob grits can be put into grist feed for sale to cattle growers. While this is not a step of the invention itself, the use of the spent grits and the removed coating in or as cattle feed constitutes an important advantage of the invention.

It will be clear from the foregoing that my invention constitutes a safe, economical and efficient method of preparing hopper cars and the like for immediate re-use in the transportation of flour or meal in dry bulk form through the use of commercially available apparatus and material. Many of these advantages also accrue in the use of the invention for removing such deposits, coating, and/or mold from storage bins or compartments, although possibly not to the extent that the invention is advantageous as applied to railroad hopper cars and truck trailers.

My invention, of course, is not limited to any particular apparatus or to any particular size or grade of grits, although the preferred sizes or grades lie in the medium range. The best size or grade for a particular operation will, of course, vary with the circumstances, but the best size or grade can be readily determined by the operator in a minimum of time. In general, the removal of mold appears to be best accomplished by a somewhat coarser grit, whereas the slightly finer grit appears to be faster and more efficient in the removal of deposits and coatings where mold is not a substantial problem.

In most instances it is possible to separate the vacuumed mixture of grits and deposit or coating, but the economy of corncob grits renders it rather doubtful that this would be a feasible step under normal circumstances.

The use of corncob grits and other cellulose materials in specialized blasting operations has been known for some time. However, to my knowledge it has never been realized or appreciated that such grits could be used as a step in the solution of the long-standing problems which have been solved by this invention, or that such grits could be used in the manner proposed by this invention to achieve the distinct advantages and efficiency achieved by this invention. As applied to covered railroad hopper cars alone, there are many thousands of cars in use in which this problem has existed for many years. There is also a general shortage of these cars in the industry, and this would seem to be caused in no small part by the substantial delays that often are inherent in the present processes of restoring or preparing "dirty" cars for re-use in flour or meal service. The practice of this invention should be a factor in alleviating this shortage. It is believed that this invention constitutes a distinct contribution to the milling, railroad and trucking industries, and it is eliciting substantial interest in these industries.

Having thus described my invention in the manner required by the patent statutes, and set forth specific examples thereof, I claim:

1. A method of preparing an unloaded plastic-lined railroad covered hopper car for re-use in transporting meal or flour in dry bulk form, comprising removing a coating selected from the group consisting of residual meal deposits, flour deposits, and mold from the interior plastic-lined surfaces of the car by directing onto said surfaces a stream of air and granulated nontoxic cellulose material, and vacuuming the removed deposits and the granulated material to remove them from the interior of the car.

2. A method as set forth in claim 1 wherein the granulated cellulose material comprises corncob grits.

3. A method of removing a coating selected from the group consisting of residual meal deposits, flour deposits, and mold, said coating being caused by condensation on the interior surfaces of an enclosed compartment which has been used for the transportation or storage of meal or flour in bulk form, comprising directing onto the interior coated surfaces a stream of compressed air and granulated non-toxic cellulose material.

4. A method as set forth in claim 3 wherein the granulated material is corncob grits.

5. A method as set forth in claim 4 wherein the meal or flour is edible wheat flour.

6. A method as set forth in claim 4 wherein the meal or flour is edible cornmeal.

7. A method as set forth in claim 4 wherein the enclosed compartment comprises a plastic-lined compartment.

8. A method as set forth in claim 4 wherein the enclosed compartment comprises a plastic-lined railroad covered hopper car.

9. A method as set forth in claim 8 comprising the further step of vacuuming the compartment to remove therefrom the corncob grits and the removed coating of meal or flour.

10. A method as set forth in claim 9 wherein the hopper car is of the type which includes a textile fabric member in the bottom thereof.

References Cited

UNITED STATES PATENTS

| | | | |
|---|---|---|---|
| 1,750,498 | 3/1930 | Truax | 134—7 XR |
| 1,934,826 | 11/1933 | Shepherd | 134—24 XR |
| 2,087,694 | 7/1937 | Malmros | 51—318 |
| 2,455,514 | 12/1948 | Mead. | |
| 2,462,982 | 3/1949 | MacClean et al. | 134—7 |
| 2,622,047 | 12/1952 | Ayers | 134—7 |
| 2,652,662 | 9/1953 | Newell | 51—320 XR |

OTHER REFERENCES

Soft Grits for Blast Cleaning, American Machinist, June 12, 1950, vol. 94, issue 12, p. 127.

MORRIS O. WOLK, *Primary Examiner.*

J. ZATARGA, *Assistant Examiner.*

U.S. Cl. X.R.

134—8, 21; 15—3; 51—320